May 1, 1945.  B. BARENYI ET AL  2,374,911

RESILIENTLY ARTICULATED VEHICLE FRAME AND WHEEL SUSPENSION

Filed June 7, 1941

INVENTORS
BELA BARENYI AND KARL WILFERT
BY
ATTORNEYS

Patented May 1, 1945

2,374,911

UNITED STATES PATENT OFFICE 2,374,911

RESILIENTLY ARTICULATED VEHICLE FRAME AND WHEEL SUSPENSION

Béla Barényi, Vaihingen-Rohr a. d. F., and Karl Wilfert, Sindelfingen, Germany; vested in the Alien Property Custodian Application June 7, 1941, Serial No. 397,009
In Germany April 26, 1940

25 Claims. (Cl. 180—64)

The present invention relates to a resilient connection of a wheel suspension or an axle assembly to the frame or the body of a vehicle, especially for vehicles with oscillating half axles, and is a continuation-in-part of our co-pending application Serial No. 374,842, filed January 17, 1941, now abandoned.

Devices for resiliently connecting a wheel suspension or an axle assembly to the frame or the body of a vehicle are described in the copending application Serial No. 397,008, filed June 7, 1941 and now Patent No. 2,326,918 granted August 17, 1943, for "Resilient connection of a wheel suspension or a suspension of an assembly of an axle to a vehicle" of the same inventors, referred to above according to which the wheel suspension or the axle assembly is guided by a link quadrangle actuated by springs and swingably arranged in a substantially vertical plane in such a manner, that the wheel suspension or the axle assembly may yield transversely relative to the frame or the body of the vehicle. The said co-pending application discloses an axle assembly connected by a cross member to the frame and further connected to the frame by conventional spring suspension means, the said cross member being additionally connected with the vehicle by a member independent from the mentioned spring suspension, and capable of yielding substantially in transverse directions and in upward directions but providing for a minimum yielding in other directions.

The present invention relates to an improvement of the above described type of resilient connection consisting in arranging the pivoted links in parallelogram form wherein two sides are substantially parallel to and on opposite sides of a plane passing through the axes of the ground engaging wheels whereby the forces transmitted by the axles to the frame or to the body of a vehicle due to travel of the vehicle upon an uneven surface, and tending to place lateral bending and tilting stresses on the body of the vehicle, are substantially absorbed at the joints connecting the parallel links. Resiliency in other directions including directions substantially coincidental with or parallel to the axes of the joints can also be provided by using resilient bushings of rubber in the joints connecting the links, this arrangement being advantageously adaptable to tilting the axes of the pivots connecting the links toward or into coincidence with the direction of the principal movements of the wheels by road shock.

The described resilient connection is also advantageously adaptable to flexibly connect subdivisions of a subdivided vehicle frame or body such as in the instance wherein one of the subdivisions includes an axle assembly and a driving motor formed as a unit desirably or necessarily to be connected flexibly with the remaining subdivision or subdivisions of the vehicle frame or body. In the instance of a subdivided frame or body wherein the point of division is angulated either rearwardly or forwardly with respect to the road surface, the above described arrangement can be advantageously adapted, through arranging the axes of the link joints parallel to the said point of division.

In the accompanying drawing two constructions according to the invention are diagrammatically shown by way of example.

Figure 1:
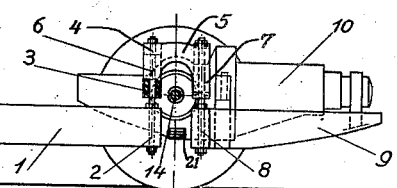
Fig. 1 is a side elevation partly in section of a resilient connecting device according to the invention.
Figure 2:
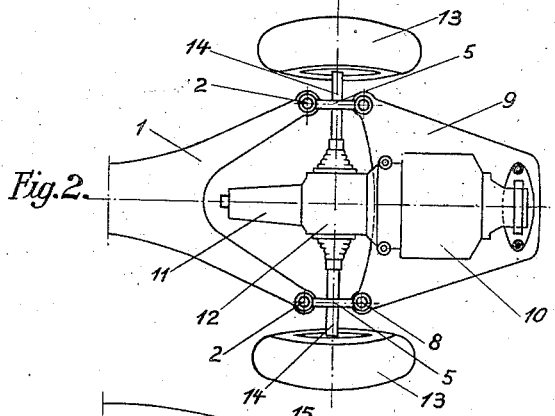
Fig. 2 is the plan view of the construction shown in Fig. 1.
Figure 5:
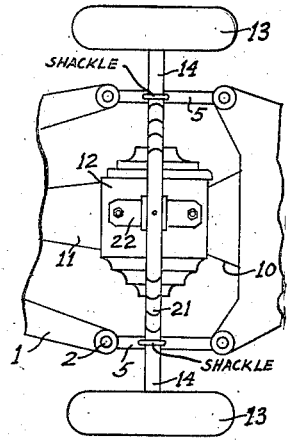
Figure 5 is a bottom plan view of Figure 2, showing the arrangement of the spring suspension for the stub axles.

In the construction shown in Figs. 1 and 2 the rear end of the frame 1 is forked. At the ends of the forked arms vertical pivots 2 which are received through the lower ends of the boxes of vertical tubular arms 6 of the inverted U-shaped links 5 are mounted upper and lower resilient rubber bushings 3 and 4, respectively, are vulcanized or otherwise suitably secured to upper and lower portions of the pivots 2 and the boxes of the tubular arms 6. Due to this arrangement the links 5 may yield about the axes of the pivots 2 to a limited extent against the resistance of the rubber bushings or buffers 3 and 4, without any metal to metal contact between the pivots 2 and the links 5.

The remaining tubular arms 7 of the links 5 turn on vertical pivots 8 fixed to rise from a frame plate 9. The pivots 8 may or may not be shock-insulated from and connected to the tubular arms 7 with the type of resilient rubber bushings or buffers hereinbefore described. In either arrangement the resultant is a quadrangle constituted by the frame 1 and the frame plate 9 and the two links 5, articulated in the pairs of pivots 2 and 8 for lateral movement relative to each other in a generally horizontal plane. A driving motor 10 is suitably fixed on the frame plate 9, with a drive assembly including a differential 12 and a change speed transmission 11 projecting toward and into the space between the fork arms on the frame 1, the links 5, and the frame plate 9. The ground engaging vehicle drive wheels 13 are fixed on stub-axles 14 which are flexibly and operatively connected to opposite end portions of the differential 12, so that the stub-axles are free to rise and fall between the arms of the links 5 in response to inequalities in the road surface.

The suspension of the wheels may be effected by suitable spring means, for instance as shown in our prior Patent No. 2,326,918 granted August 17, 1943, by leaf spring means 21 mounted by bracket means 22 on the axle housing 12 or on the subsidiary frame plate 9 or on the main frame I by suitable bracket means. Springing the stub-axles from the subsidiary frame 9 has the advantage that the stresses and shocks absorbed by the springs 21 can reach the main vehicle frame I or the body of the vehicle thereon only after being dampened by the rubber bushings 3 and 4.

Due to the arrangement of the link quadrangle adapted to swing in the horizontal plane and formed by the links 5, the transverse movements and transverse shocks, occurring during elastic deflection of the oscillating half axles 14, may be compensated by lateral yielding of the driving assembly or the frame plate 9, so that the frame or the body of the vehicle may substantially remain unaffected by these transverse shocks and transverse movements.

Figure 3:
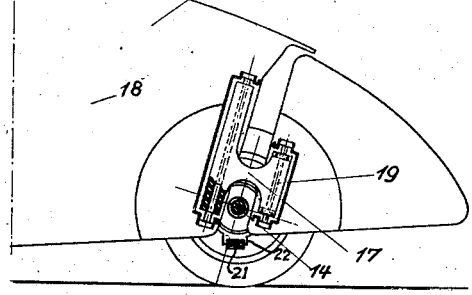
Figure 3 is a side elevation of another embodiment of the invention, partly broken away to show details of the bushing structure.
Figure 4:
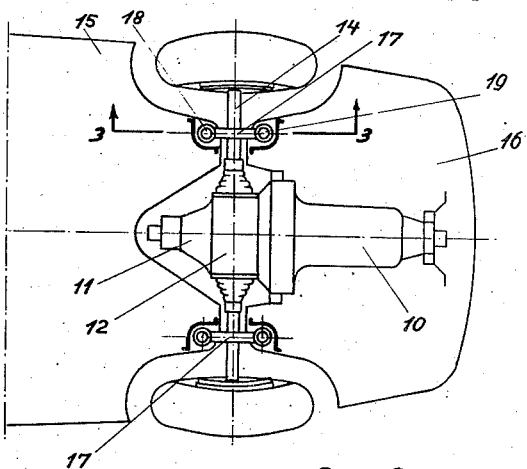
Figure 4 is a plan view of the device illustrated in Figure 3.

The construction shown in Figs. 3 and 4 differs from the construction described above chiefly by the fact that instead of a special frame I a self-supporting carriage body 15 is provided which is connected to the rear section 16 of the body on the vehicle by the H-shaped links 17. The pivots 18 and 19 of the connecting joints of the links 17, furthermore, are not arranged vertically to the track or road but about in a direction of shock of the wheel and about in parallel to the separating joint 20 between the sections 15 and 16 of the body of the vehicle. For the rest, the arrangement is the same as in the case of the construction according to Figs. 1 and 2, the driving aggregate 10, 11, 12 being mounted upon the rear section 16 of the body of the vehicle.

Due to the fact that the oscillating half axles 14 are positioned between the joints 2 and 3 of the links 5 or between the joints 18 and 19 of the links 17 respectively, i. e. that the joints of the links are arranged at opposite sides of a substantially vertical transverse plane extending through the axes of the wheels, the links are only slightly strained by the wheel pressures occurring, so that a highly safe connection of the axle assembly or the portion of the vehicle connected to the axle assembly to the rest of the vehicle is assured.

Axle aggregate or assembly according to the invention means an axle with two wheels together with the axle drive, the change gear and the motor. A part of an axle aggregate means therefore either the axle with the two wheels or this part together with the axle drive or these two parts with the change-speed gear. The term "frame" as used throughout the specification and claims covers not only such frames when separate from the body or coachwork of the vehicle, but also as applicable to so-called "frameless" vehicles in which the body itself serves as the vehicle frame.

Having now particularly described and ascertained the nature of our said invention and in what manner the same is to be performed we declare that what we claim is:

1. In a vehicle having a main frame, a subsidiary frame, a pair of generally horizontal links pivotally connecting said main and subsidiary frames in such a manner that said links form with said main and subsidiary frames a parallelogram swingable transversely to said vehicle, means for resisting said transverse swinging movement, a pair of road wheels for said vehicle including axle means, and vertically resilient means connecting said road wheels to said subsidiary frame, said axle means extending transversely of said vehicle and positioned in a vertical transverse plane intermediate said main and subsidiary frames.

2. The combination according to claim 1, in combination with means resilient in all directions for pivotally connecting said links to said main and subsidiary frames.

3. The combination according to claim 1, in combination with rubber sleeves about the ends of said links, serving to pivotally connect said links to said frame.

4. The combination according to claim 1, in which said axles are swinging half-axles, in combination with driving means for said vehicle mounted on said subsidiary frame, and means for pivotally connecting said swinging half-axles to said driving means.

5. The combination according to claim 1, in combination with a vehicle engine mounted on said subsidiary frame, and means for driving said wheels from said engine.

6. The combination according to claim 1, in which said main frame is formed with a transverse rear fork, and the links are pivotally connected to the main frame at the ends of this fork.

7. The combination according to claim 1, in combination with a change speed gear and driving gear for said wheels, attached to said subsidiary frame and positioned intermediate said main and subsidiary frames.

8. The combination according to claim 1, in combination with an engine, change-speed gear and driving gears for said wheels, all mounted on said subsidiary frame, said change-speed gear and driving gears being positioned forwardly of said engine and intermediate said main and subsidiary frames.

9. The combination according to claim 1, in which said links are in the shape of an inverted U whose top forms the horizontal part of the links and whose legs are pivotally connected to said frames, in combination with means resilient in all directions pivotally mounting said legs on said frame.

10. In a vehicle having a main frame, a subsidiary frame, a pair of links in the form of an inverted U, means pivotally connecting the legs of said U to said main and auxiliary frames, whereby said links form with said frames a parallelogram swingable transversely of said vehicle, said pivotal means including a pair of vertically spaced joints for each leg, resilient in all directions, a pair of road wheels for said vehicle, and axle means connecting said road wheels to said subsidiary frame, said axle means extending transversely of said vehicle and being positioned in a transverse vertical plane passing between the legs of said pair of links.

11. The combination according to claim 1, in combination with means resilient in all directions pivotally connecting said links to said main and subsidiary frames, the axis of said resilient means extending in an oblique direction to absorb the upward and rearward shocks upon the wheels.

12. In a vehicle having a main frame, a subsidiary frame, a pair of H-shaped links, means pivotally connecting the legs of each H to said main and auxiliary frames, whereby said links form with said frames a parallelogram swingable transversely of said vehicle, said pivotal means including a pair of vertically spaced joints for each leg, resilient in all directions, a pair of road wheels for said vehicle, and axle means connecting said road wheels to said subsidiary frame, said axle means extending transversely of said vehicle and positioned in a transverse vertical plane passing between the legs of each pair of links.

13. In a vehicle having a main frame, a driving unit for said vehicle, including gears and driven wheels, a pair of generally longitudinally extending links pivotally connected at one end to said frame and at its other end to said driving unit to form a parallelogram with said main frame and driving unit, whereby said main frame and driving unit can move relatively to one another, transversely of said vehicle, and means for yieldably resisting this relative motion.

14. The combination according to claim 13, in combination with two pairs of substantially vertical pivot blocks, one pair connected to said main frame and the other to said driving unit, forming the pivotal connection for said links, and in which each link is formed as a substantially inverted U, the top of which extends longitudinally of the vehicle, and the legs of which are mounted in said vertical pivot blocks.

15. The combination according to claim 13, in which said driving unit includes the vehicle engine.

16. The combination according to claim 13, wherein each of said wheels is mounted on a swinging half-axle, and spring means effectively connects each swinging half-axle to and suspends it from said driving unit.

17. In a vehicle having a main frame, a subsidiary frame, a pair of generally horizontal links pivotally connecting said main and subsidiary frames in such manner that said links, said main frame, and said subsidiary frame together form a parallelogram swingable transversely of said vehicle, means resisting said transverse swinging movement, a pair of road wheels for said vehicle including axle means and vertically resilient means connecting said road wheels to said subsidiary frame, said axle means extending transversely of the vehicle and positioned in a vertical transverse plane passing between said main and subsidiary frames, said links being substantially H-shaped with the legs of the H forming the pivotal connections with said main and subsidiary frames, and means resilient in all directions pivotally mounting the said legs on the frames.

18. In a vehicle having a main frame, a subsidiary frame, a pair of generally horizontal links pivotally connecting said main and subsidiary frames in such manner that said links, said main frame, and said subsidiary frame together form a parallelogram swingable transversely of said vehicle, means resisting said transverse swinging movement, a pair of road wheels for said vehicle including axle means and vertically resilient means connecting said road wheels to said subsidiary frame, said axle means extending transversely of the vehicle and positioned in a vertical transverse plane passing between said main and subsidiary frames, said links being substantially H-shaped with the legs of the H extending in the direction of the resulting upward and rearward shocks upon the wheels and forming the pivotal connections to said main and subsidiary frames, and means resilient in all directions pivotally mounting said legs on the frames.

19. In a vehicle having a chassis including a main frame and a subsidiary frame, a driving assembly on said subsidiary frame comprising a motor, articulated axle means including stub axles having ground engaging wheels, said stub axles being operatively connected with the motor, said axle means being positioned between the main frame and the subsidiary frame, laterally spaced vertical axis joint forming elements on said main and subsidiary frames, longitudinal links bridging the space between the main and subsidiary frames and having vertical axis joint forming elements at their ends cooperatively connected with the first mentioned joint forming elements whereby the frames are connected and the subsidiary frame can swing laterally with respect to the main frame in response to road inequalities, said joint forming elements including means permitting flexing of the cooperatively connected joint forming elements relative to each other at least in vertical directions, and laterally spaced independent vertically acting spring means for and connected to each stub axle, and bracket means on said chassis to which said spring means are anchored.

20. A vehicle according to claim 19 wherein said bracket means are mounted on the main frame.

21. A vehicle according to claim 19 wherein said bracket means are mounted on the subsidiary frame.

22. A vehicle according to claim 19 wherein some of said bracket means are mounted on the main frame and other of said bracket means are mounted on the subsidiary frame.

23. A vehicle having a chassis comprising a main frame and a subsidiary frame arranged one behind the other, a pair of laterally spaced vertical pivots on the adjacent ends of the frames, longitudinal links swingably connected at their ends to the corresponding pivots whereby the subsidiary frame can swing laterally with respect to the main frame, geared axle means located between the main frame and the subsidiary frame and including articulated stub axles having ground engaging wheels, motor means on said subsidiary frame operatively connected to said axle means for driving the stub axles, and individual spring means suspending said stub axles on said chassis.

24. A vehicle according to claim 23 wherein the said vertical pivots project upwardly from the adjacent ends of the main and subsidiary frames, in substantially perpendicular manner.

25. A vehicle according to claim 23 wherein the axes of said vertical pivots are rearwardly angulated with respect to the adjacent ends of the main and subsidiary frames.

BÉLA BARÉNYI.
KARL WILFERT.